(12) United States Patent
Scordino et al.

(10) Patent No.: US 8,172,054 B2
(45) Date of Patent: May 8, 2012

(54) CLUTCH ARRANGEMENT WITH A CLUTCH DRIVE

(75) Inventors: Michael Scordino, Canton, MI (US);
Matt Winhold, Howell, MI (US);
Carsten Zuehl, Schwelnfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 676 days.

(21) Appl. No.: 12/339,453

(22) Filed: Dec. 19, 2008

(65) Prior Publication Data

US 2009/0159388 A1   Jun. 25, 2009

(30) Foreign Application Priority Data

Dec. 19, 2007 (DE) .......................... 10 2007 061 242

(51) Int. Cl.
*F16H 45/02* (2006.01)
(52) U.S. Cl. ........................................................ 192/3.3
(58) Field of Classification Search ................. 192/3.28, 192/3.29, 3.3, 70.18, 70.28
See application file for complete search history.

(56) References Cited

U.S. PATENT DOCUMENTS

| | | | | |
|---|---|---|---|---|
| 3,695,404 A | * | 10/1972 | Maucher et al. | 192/70.18 |
| 5,400,884 A | * | 3/1995 | Matsuoka | 192/3.3 |
| 2007/0181396 A1 | * | 8/2007 | Maienschein et al. | 192/3.29 |
| 2008/0121483 A1 | * | 5/2008 | Sasse et al. | 192/3.3 |
| 2009/0152067 A1 | * | 6/2009 | Cmich | 192/3.29 |
| 2009/0152068 A1 | * | 6/2009 | Hoffmann et al. | 192/3.29 |

\* cited by examiner

*Primary Examiner* — Gregory Binda
*Assistant Examiner* — Josh Skroupa
(74) *Attorney, Agent, or Firm* — Cozen O'Connor

(57) ABSTRACT

A clutch arrangement includes a clutch device for transmitting torque between a clutch housing and a takeoff, wherein a pressure element and an opposing pressure element cooperate to establish and release a working connection between at least one drive-side clutch element and at least one takeoff side clutch element. The opposing pressure element is mounted nonrotatably and without freedom of axial movement on the clutch housing, and is connected to at least one drive-side clutch element by axially acting energy storage devices. A takeoff-side clutch element is located between a drive-side clutch element and the opposing pressure element, and between any adjacent drive-side clutch elements. Alternatively, the axially acting energy storage devices can connect the drive-side clutch elements to the clutch housing.

18 Claims, 5 Drawing Sheets

CLUTCH ARRANGEMENT WITH A CLUTCH DRIVE

BACKGROUND OF THE INVENTION

1. Field of the Invention

The invention pertains to a clutch arrangement including a clutch device for transmitting torque between a clutch housing and a takeoff, wherein a pressure element and an opposing pressure element cooperate to establish and release a working connection between at least one drive-side clutch element and at least one takeoff side clutch element.

2. Description of the Related Art

A clutch arrangement of this type is known from U.S. Pat. No. 5,964,329. The clutch arrangement treated there, especially in FIG. 5, is designed as a hydrodynamic torque converter, in which the hydrodynamic circuit is formed by a pump wheel, a turbine wheel, and a stator. The torque converter works together with a clutch device, which, when engaged, bridges the hydrodynamic circuit. In the disengaged position of the clutch device, however, the hydrodynamic circuit is active and thus able to transmit torque from a clutch housing of the clutch arrangement to a takeoff such as the torsion damper hub of a torsional vibration damper.

The clutch device has an axially movable piston as a pressure element, which produces the engaged or disengaged position; an opposing pressure element which absorbs the force of this pressure element; and a plurality of clutch elements arranged between the pressure element and the opposing pressure element. One of these clutch elements is connected for rotation in common to the clutch housing by a set of teeth forming a permanent part of the clutch housing, whereas two other clutch elements are connected for rotation in common to an input part of the torsional vibration damper, also by sets of teeth. When the clutch device is brought into the engaged position, the individual clutch elements enter into working connection with each other by way of friction linings, so that the torque supplied by the clutch housing can be transmitted via the torsional vibration damper to the torsion damper hub.

In clutch devices of this type, the connection between the fixed set of teeth on the clutch housing and the set of teeth on the associated clutch element has proven to be disadvantageous, because the connection for rotation in common thus established between the clutch housing and the clutch element in the circumferential direction must have a certain amount of play for fabrication reasons, and as a result, rattling noises in the area of this toothed connection are unavoidable when load-change impacts occur or when torsional vibrations are introduced. This problem is especially acute when, as in the clutch arrangement according to U.S. Pat. No. 5,964,329, the toothed connection between the clutch housing and the clutch element is provided in the radially outer area of the clutch housing and therefore on a large diameter.

SUMMARY OF THE INVENTION

The invention is based on the task of designing a clutch device of a clutch arrangement in such a way that, even when load change impacts or torsional vibrations occur, the overall system will operate as quietly as possible.

According to the invention, a clutch device in a clutch housing is provided on a clutch arrangement, this clutch device having a pressure element to produce the engaged or disengaged position, an opposing pressure element to absorb the axial force of the pressure element, and a plurality of clutch elements between the pressure element and the opposing pressure element. By mounting the opposing pressure element nonrotatably and axially immovably on the clutch housing, one of the essential conditions for the noise-free operation of the clutch device is created. It is especially advantageous for the opposing pressure element to be connected to the clutch housing by means of a welding process, especially by means of a laser welding process or an arc welding process, which produces very little distortion of the clutch housing, the opposing pressure element being connected to the clutch housing preferably axially between the housing cover of the clutch housing and the main housing part of the clutch housing.

The opposing pressure element attached in this way to the clutch housing holds at least one clutch element in nonrotatable but axially movable fashion, preferably by means of a plurality of axially-acting energy-storage devices. In this way, although the clutch elements execute axial movement relative to the opposing pressure element, which is essential to the production of the engaged position or the disengaged position of the clutch device, the axially-acting energy-storage devices prevent any relative movement of the minimum of one clutch element versus the opposing pressure element in the circumferential direction. Because of the nonrotatable attachment of this clutch element, at least one of which is provided, this clutch element acts functionally as a drive-side clutch element. Alternatively, this minimum of one clutch element could be attached to the clutch housing, especially since the opposing pressure element is also mounted nonrotatably and axially immovably on the clutch housing.

If not just a single drive-side clutch element but rather a plurality of them is provided, these clutch elements will then also be connected to each other by means of axially-acting energy-storage devices in a fashion which prevents relative rotation but allows relative axial movement. In this case, an assembly is created, in which the clutch element adjacent to the opposing pressure element is connected on one side to the opposing pressure element by means of axially-acting energy-storage devices, whereas, on the other side, i.e., the side facing away from the opposing pressure element, this first clutch element is connected to another clutch element, this connection also being established by means of axially-acting energy-storage devices. This second clutch element, i.e., the one farther away from the opposing pressure element, can in turn be in working connection with yet another clutch element by means of axially-acting energy-storage devices, where all of these clutch elements serve as drive-side clutch elements. Alternatively, however, all of the previously mentioned clutch elements could be attached by means of the axially-acting energy-storage devices directly to the opposing pressure element or possibly directly to the clutch housing.

A clutch element which is not connected nonrotatably to the opposing pressure element or to the clutch housing but which instead is in working connection in the circumferential direction with a takeoff such as a torsion damper hub is provided axially between the opposing pressure element and the adjacent, drive-side clutch element or between the clutch housing and the adjacent, drive-side clutch element. Functionally, what is involved here is therefore a takeoff-side clutch element. If additional takeoff-side clutch elements are provided, each will be located between two adjacent drive-side clutch elements. When the clutch elements are moved into their engaged position, therefore, the drive-side clutch elements, under deformation of the associated axially-acting energy-storage devices, are subjected to a force acting in the direction toward the opposing pressure element and thus, as they approach each other, they will establish a frictional connection with the takeoff-side clutch elements. The axially-acting energy-storage devices are preferably pretensioned in such a way that that they try to return the clutch elements to their disengaged position, which has the effect of decreasing the slippage losses. The movement of the components of the clutch device into their engaged position therefore proceeds in opposition to the pretension of the axially-acting energy-storage devices. Alternatively, the energy-storage devices could also be pretensioned in the opposite direction. As a result, the reaction time of the engagement or disengagement process can be reduced.

Reducing the axial force applied by the pressure element toward the opposing pressure element has the effect of at least partially releasing the clutch elements from each other, thus leading to an at least partial transition of the clutch device to the disengaged position, which, as previously mentioned, is preferably supported by the axially-acting energy-storage devices.

Moving the pressure element from the engaged position of the clutch device to the disengaged position is preferably accomplished by locating the pressure element between two pressure spaces, where the pressure gradient generated between the two pressure spaces at the moment in question determines the direction in which the pressure element will move.

Advantageous ways of connecting the axially-acting energy-storage devices to the opposing pressure element and to the drive-side clutch elements are described in the claims. It is especially advantageous for the drive-side clutch elements to have an at least essentially ring-shaped base body, beyond which energy-storage device mounts radially project, each of which serves to accept the corresponding end of an axially-acting energy-storage device. In this way, the connection of the clutch elements to each other or to the opposing pressure element or to the clutch housing can be accomplished a certain radial distance away from the friction surface of the associated clutch element. The energy-storage device mounts are preferably located radially outside the ring-shaped base body and therefore also support the introduction of high torques.

The takeoff-side clutch elements are preferably connected for rotation in common to the input part of a torsional vibration damper, so that any load change impacts or torsional vibrations transmitted via the clutch elements of the clutch device can be damped before they reach the takeoff, i.e., the torsion damper hub. It is advantageous here for a cover plate of the torsional vibration damper to be provided with external profiling, which is connected for rotation in common to an internal profiling provided on the takeoff-side clutch elements.

A flow guide element is preferably assigned to the pressure element of the clutch device. This guide element has a spacer on the side facing the pressure element, so that in this way a flow groove is formed between the pressure element and the flow guide element. According to an advantageous design, this flow guide element is connected to the pressure element by means of rivets and is provided on the side of the pressure element facing the clutch element. Radially on the outside, this flow guide element has a flow-through opening, which leads to the radially oriented area of the clutch elements, and it also has a support, by which it comes in contact with the adjacent clutch element when subjected to load by the pressure element, so that ultimately the flow guide element serves to transmit the applied force between the pressure element and the clutch elements. Because of this flow guide element, fresh fluid can be conducted directly to the radially oriented area of the clutch device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
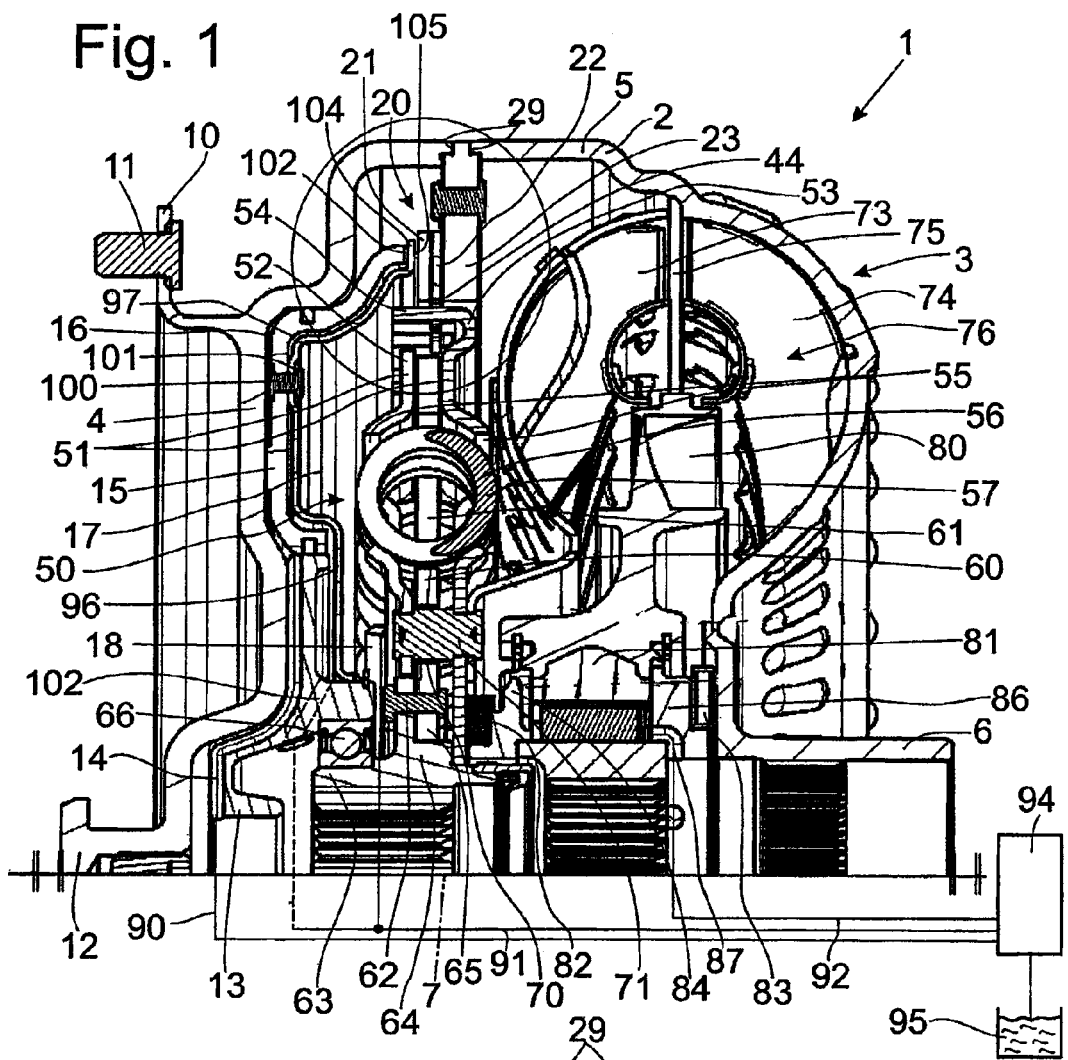
FIG. 1 shows the upper half of a longitudinal cross section through a clutch arrangement, designed as a hydrodynamic torque converter, with a clutch device and a torsional vibration damper.

The clutch arrangement 1 shown in FIG. 1 has a clutch housing 2, which is made up essentially of a housing cover 4 and a main housing part 5. This clutch housing 2 is able to rotate around an axis of rotation 7 and acts as a drive 3 with respect to the clutch device 20, to be explained in detail below.

To center the clutch housing 2, the housing has a bearing journal 12 in its radially inner area. This journal engages in a recess (not shown) in a drive device such as the crankshaft of an internal combustion engine. How this can be accomplished is illustrated in FIG. 1 of U.S. Pat. No. 4,523,916, for example.

On the radially outer area of the housing cover 4, a drive flange 10 is formed, which serves to hold fastening elements 11. These fastening elements are provided to attach the drive flange 10 and thus the clutch housing 2 to a plate with flexibility in the axial direction, as is also the case in FIG. 1 of U.S. Pat. No. 4,523,916. A flexible plate of this type is usually attached to the crankshaft of an internal combustion engine.

The housing cover 4 has a drive-side housing hub 13 on the side facing away from the bearing journal 12, whereas the main housing part 5, in its radially inner area, is provided with a takeoff-side housing hub 6. Axially between the drive-side housing hub 13 and the housing cover 4 there is a first flow-through passage 14, which leads at the radially outer end to a first pressure space 16 and is connected radially on the inside to a first flow line 90, which is itself connected to a fluid source 95 by way of a distribution station 94. The first pressure space 16 is separated from a second pressure space 17 by a pressure element 15, which is mounted on the drive-side housing hub 13 with freedom of axial movement. The second pressure space 17 extends axially between the pressure element 15 and a torsional vibration damper 50, which will be explained in detail further below. This second pressure space is in working connection with a second flow passage 18; a second flow line 91 connects this second flow passage 18 to the fluid source 95 by way of the distribution station 94.

Finally, a third flow line 92 is connected to the fluid source 95, also by way of the distribution station 94; this third flow line 92 is connected to a hydrodynamic circuit 75, which will be explained in greater detail further below, by a third flow passage 87.

The housing cover 4 and the main housing part 5 of the clutch housing 2 are connected to each other in their radially outer areas by way of an opposing pressure element 23. This opposing pressure element 23 is preferably fastened to the clutch housing 2 by welding, preferably by means of laser welds 29, or alternatively by means of arc welds, because in this way the opposing pressure element 23 can be fastened to the clutch housing 2 with a very low degree of distortion. Thus the opposing pressure element 23, which is part of the clutch device 20, is mounted nonrotatably and without freedom of axial movement in the clutch housing 2. The clutch elements 21, 22, which are also part of the clutch device 20, are located axially between the pressure element 15 and the opposing pressure element 23. The arrangement of these elements and the manner in which they function will be explained concretely on the basis of FIG. 3.

Figure 2:
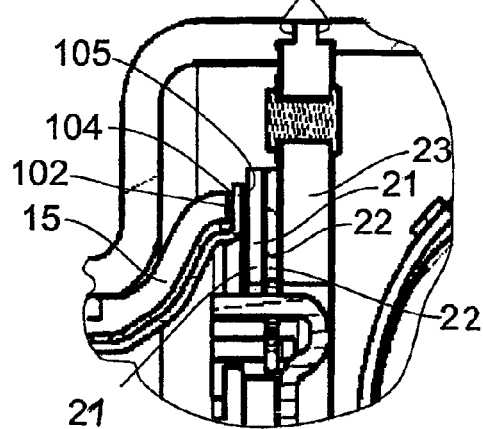
FIG. 2 shows an enlarged detail of the area of the clutch device inside the circle appearing in FIG. 1.
Figure 3:
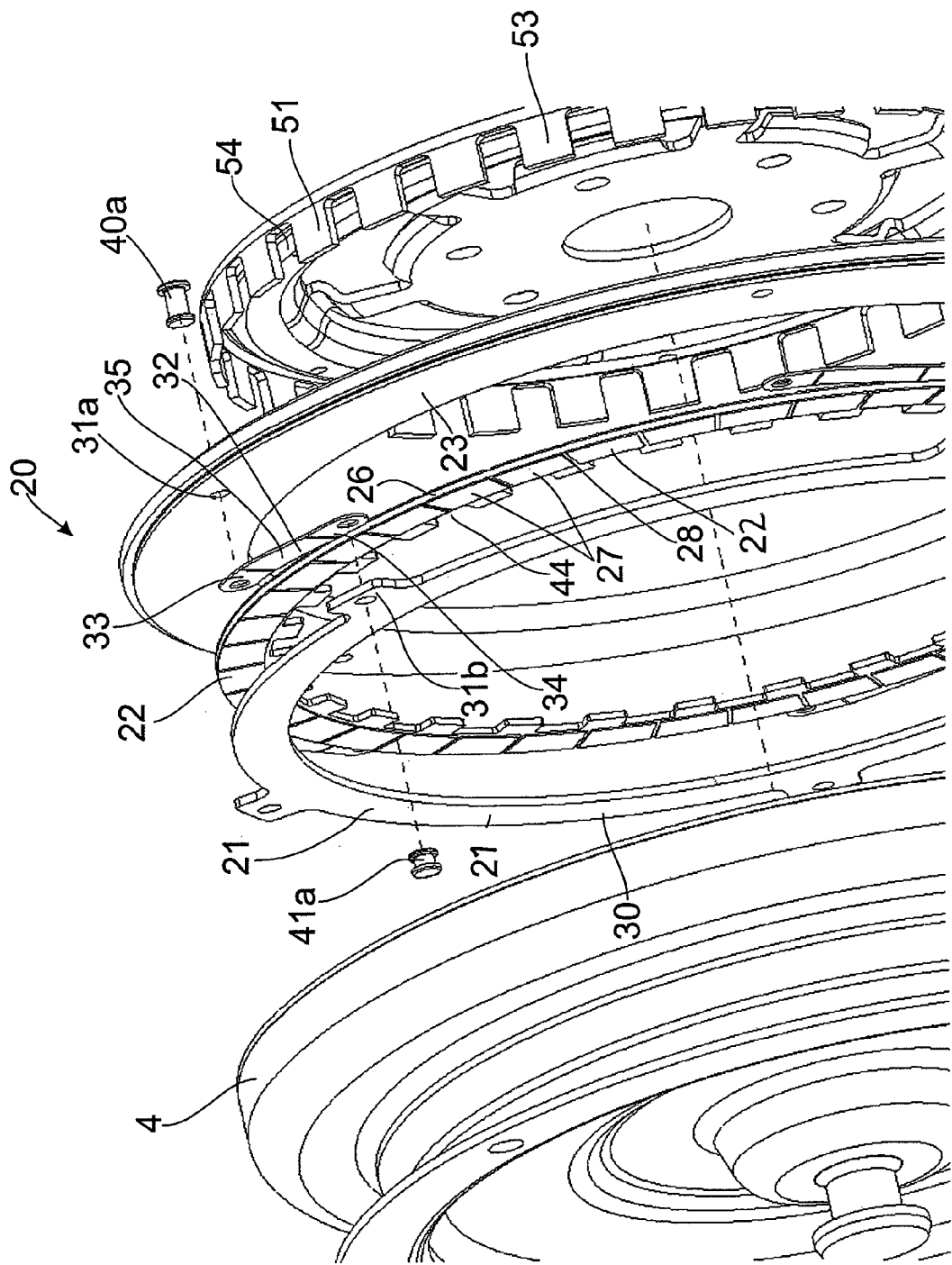
FIG. 3 shows an exploded view of the clutch device shown in FIG. 2, provided with a drive-side clutch element and a takeoff-side clutch element.

As FIG. 3 shows, the clutch element 21 has a ring-shaped base body 30, from which energy-storage device mounts 31b project radially outward. Energy-storage device mounts 31a in the opposing pressure element 23 are assigned to these energy-storage device mounts 31b. Each of the energy-storage device mounts 31a accepts a first rivet 40a, by which a first energy-storage device end 33 of one of the axially-acting energy-storage devices 32 is to be attached to the opposing pressure element 23. The second energy-storage device end 34 of the axially-acting energy-storage device 32 is attached by a second rivet 41a to one of the energy-storage device mounts 31b of the clutch element 21. Because the axially-acting energy-storage devices 32 are deformable in the axial direction but rigid in the circumferential direction, the clutch element 21 can shift its relative axial position but cannot rotate relative to the opposing pressure element 23, and therefore, like this opposing pressure element 23, is connected for rotation in common to the clutch housing 2, that is, to the drive 3. Thus this clutch element 21 forms a drive-side clutch element (see FIG. 2).

Axially between the opposing pressure element 23 and the drive-side clutch element 21, the clutch element 22 is provided. This clutch element has a lining carrier 26, to both sides of which friction linings 27 are attached, which carry grooves 28. The friction lining carrier 26, i.e., the clutch element 22, has an internal profiling 44 in the form of a set of teeth, which is connected nonrotatably to an external profiling 54, in the form of an opposing set of teeth, on a cover plate 53. This cover plate 53 is part of the previously mentioned torsional vibration damper 50 shown in FIG. 1, which, in addition to the cover plate 53, also has another cover plate 52. Because of the special arrangement of the present torsional vibration damper 50, the cover plate 52 will be referred to in the following as the drive-side cover plate, whereas the cover plate 53 will be referred to as the takeoff-side cover plate. The two cover plates 52, 53 together form an input part 51 of the torsional vibration damper 50 and have openings 55, each of which accepts one of the circumferential springs 56 of a set 57 of circumferential springs. Via the circumferential springs 56, the input part 51 of the torsional vibration damper 50 cooperates with a hub disk 60, which also has openings 61 for the circumferential springs 56 of the circumferential spring set 57, and it is connected by rivets 62 to a torsion damper hub 63. The hub disk 60 works together with the torsion damper hub 63 as the output part 65 of the torsional vibration damper 50, whereas the torsion damper hub 63 acts as the takeoff 64 for the clutch device 20. Thus the clutch element 22 connected to the takeoff-side cover plate 53 of the torsional vibration damper 50 acts as the takeoff-side clutch element.

Whereas the torsion damper hub 63 of the torsional vibration damper 50 is positioned by a bearing 66 radially and axially with respect to the drive-side housing hub 13 of the clutch housing 2, a turbine wheel 73 is attached by pins 71 to the cover plates 52 and 53. The pins 71 pass through openings 70 in the hub disk 60, the openings 70 being larger in the circumferential direction than the pins 71. These openings 70 therefore serve as stops for the relative rotational deflection between the input part 51 and the output part 65 of the torsional vibration damper 50.

The turbine wheel 73 cooperates with a pump wheel 74 and with a stator 80, where the pump wheel 74, the turbine wheel 73, and the stator 80 together form the hydrodynamic circuit 75. The clutch arrangement 1 is therefore realized as a hydrodynamic torque converter 76.

The previously mentioned stator 80 is mounted on a freewheel 81, which is positioned in the axial direction by a drive-side stator bearing 82 and a drive-side stator thrust washer 84 and also by a takeoff-side stator bearing 83 and takeoff-side stator thrust washer 86. The previously mentioned third flow passage 87 is also provided in at least one of the two stator thrust washers 84, 86.

Before the way in which the present clutch device 20 operates is described in detail, it should be pointed out that, on the side of the pressure element 15 facing away from the housing cover 4, a flow guide element 96 is provided. This flow guide element 96 has, on the side facing the pressure element 15, spacers 101, and it is fastened by rivets 100 to the pressure element 15. Because of the spacers 101, a flow groove 97 is created axially between the pressure element 15 and the flow guide element 96; this groove is able to carry fresh fluid radially outward via a flow passage 102 directly to the clutch elements 21, 22. In the radially outermost area, the flow guide element 96 extends at least as far as the outside circumference of the pressure element 15 and therefore offers a support surface 105, via which the flow guide element 96 conducts the axial force transmitted by the pressure element 15 to the clutch elements 21, 22 and thus to the opposing pressure element 23. Flow passages 104 are provided, which are offset in the circumferential direction from the pressure areas of the pressure element 15 opposite the flow guide element 96.

The clutch device 20 works in the following way: When the distribution station 94 activates the first flow line 90 (FIG. 1), fresh fluid passes from the fluid source 95 via the first flow line 90 and first flow passage 14 into the first pressure space 16 and thus displaces the pressure element 15 from its disengaged position toward the clutch elements 21 and 22 and also toward the opposing pressure element 23. The axially-acting energy-storage devices 32 (FIG. 3) connecting the clutch element 21 to the opposing pressure element 23 are preferably prestressed in such a way that they try to increase the distance between the clutch element 21 and the opposing pressure element 23 to avoid unnecessary slippage losses. The previously described axial movement of the pressure element 15 which occurs there is a positive pressure in the first pressure space 16 and therefore causes the clutch element 21 to approach the opposing pressure element 23 in opposition to the force exerted by the axially-acting energy-storage devices 32 until ultimately a working connection is established between the clutch element 21 and the adjacent clutch element 22 in the one case and between this clutch element 22 and the adjacent opposing pressure element 23 in the other. In this so-called "engaged" position of the clutch device, torque taken over from the drive 3, i.e., from the clutch housing 2, is transmitted via the clutch device 20 and the torsional vibration damper 50, which is connected for rotation in common to the clutch element 22, to the takeoff 64. Conversely, releasing pressure from the first pressure space 16 by lowering the pressure in the first flow line 90 while simultaneously building up pressure via the second flow line 91 in the second pressure space 17 brings about an axial displacement of the pressure element 15 toward the housing cover 4, as a result of which the pressure being exerted on the clutch elements 21, 22 and on the opposing pressure element 23 is at least partially eliminated, so that, with the support of the pretension of the axially-acting energy-storage devices 32, the clutch element 21 can separate itself from the clutch element 22 and the latter can separate itself from the opposing pressure element 23. The axially-acting energy-storage devices 32 are preferably designed as leaf spring elements 35.

Figure 4:
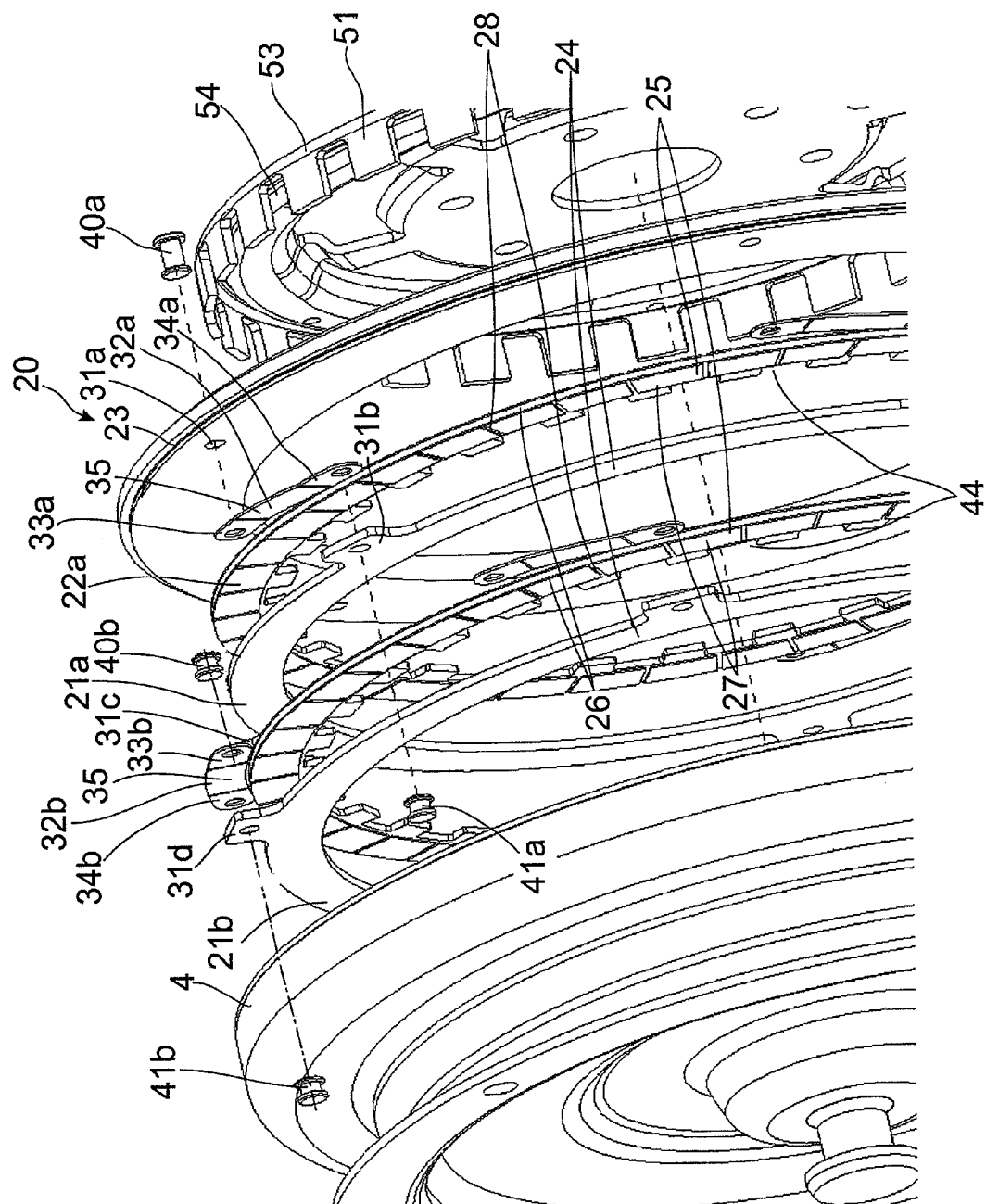
FIG. 4 is similar to FIG. 3, except that the clutch device here has a plurality of drive-side clutch elements and takeoff-side clutch elements.

In contrast to the diagram of FIG. 3, FIG. 4 shows an embodiment of the clutch device 20 with a larger number of clutch plates 21a, 21b, 22a, 22b, although, with respect to the way in which they are connected to other components of the clutch arrangement 1 and the way in which they function, they do not differ from the previously described embodiment of FIG. 3.

As shown in greater detail in FIG. 4, the opposing pressure element 23 in this embodiment again has energy-storage device mounts 31a for a first set of rivets 40a, by means of which the first ends 33a of the axially-acting energy-storage devices 32a can be connected to the opposing pressure element 23. The second ends 34a of the axially-acting energy-storage devices 32a are connected by rivets 41a to the energy-storage device mounts 31b of the clutch element 21a. This clutch element 21a is also provided with energy-storage device mounts 31c, each of which is connected by a first rivet 40b to a first end 33b of an axially acting energy-storage device 32b, each of which, by means of a second end 34b and a second rivet 41b, is connected in turn to an energy-storage device mount 31d of the clutch element 21b. In this way, the first clutch element 21a is connected to the opposing pressure element 23 nonrotatably but with freedom of axial movement by means of the axially-acting energy-storage devices 32a, whereas, by means of the axially-acting energy-storage devices 32b, the second clutch element 21b is connected nonrotatably but with freedom of axial movement to the first clutch element 21a. As also in the case of the design according to FIG. 3, the axially-acting energy-storage devices 32a, 32b are each designed as leaf spring elements 35 and are preferably prestressed in such a way that they try to keep the two clutch elements 21a and 21b separated from each other and also to keep the clutch element 21a separated from the opposing pressure element 23. Because of the nonrotatable connection, the two clutch elements 21a and 21b are logically to be considered drive-side clutch elements 21.

A clutch element 22a is provided axially between the opposing pressure element 23 and the first clutch element 21a, and another clutch element 22b is provided axially between the first clutch element 21a and the second clutch element 21b. The two clutch elements 22a and 22b carry friction linings 27 on both sides with grooves 28, and they have internal profilings 44 in the form of sets of teeth, which engage for rotation in common with an external profiling 54, in the form of an opposing set of teeth, on the previously explained takeoff-side cover plate 53 of the input part 51 of the torsional vibration damper 50. The clutch elements 22a, 22b therefore serve as takeoff-side clutch elements 22.

When the pressure element 15 (FIG. 1) is shifted into its engaged position, the two clutch elements 21a and 21b approach each other. Clutch element 21a adjacent to the opposing pressure element 23 also approaches the opposing pressure element 23. Thus the clutch element 22a is clamped between the opposing pressure element 23 and the clutch element 21a, whereas the clutch element 22b is clamped between the two clutch elements 21a and 21b. The result is the production of a working connection between the clutch elements 21a, 21b in conjunction with the opposing pressure element 23 with the clutch elements 22a, 22b.

When the pressure element 15 returns to its disengaged position, the force exerted on the clutch elements 21a-22b in the direction toward the opposing pressure element 23 is at least partially eliminated, and as a result the working connection between the individual clutch elements 21a-22b is at least partially released, especially since the axially-acting energy-storage devices 32a, 32b support this process as a result of their pretension.

The embodiments according to FIGS. 5 and 6 differ from the embodiment according to FIG. 4 only with respect to the connection and design of the energy-storage devices 32', for which reason only the aspects of these figures which pertain to the energy-storage devices 32 and 32' will be described. The designs according to FIGS. 5 and 6 are the same as that according to FIG. 4 with respect to all other aspects of design and function.

Figure 5:
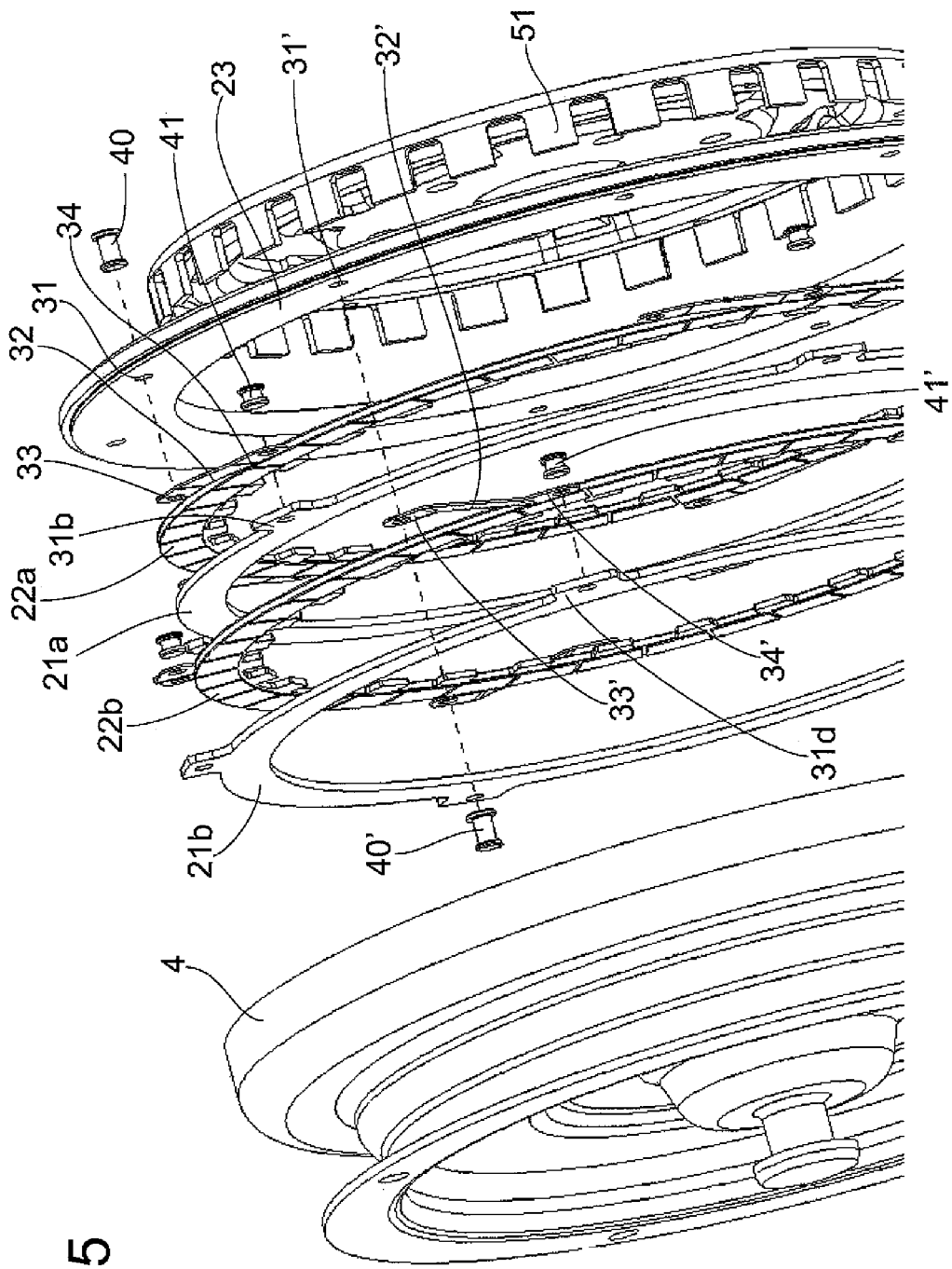
FIG. 5 is similar to FIG. 4, except that here all of the drive-side clutch elements are connected to a common opposing pressure element.

To start with FIG. 5, the first ends 33, 33' of the energy-storage devices 32, 32' are fastened by first rivets 40, 40' to energy-storage device mounts 31, 31' on the opposing pressure element 23. Whereas the second ends 34 of the energy-storage devices 32 act by way of second rivets 41 on the energy-storage device mounts 31b on the clutch element 21a, the second ends 34' of the energy-storage devices 32' are connected by second rivets 41' to the energy-storage device mounts 31d of the clutch element 21b. Because the clutch element 21a is closer axially to the opposing pressure element 23 than the clutch element 21b is, the energy-storage devices 32 have a shallower angle between their ends 33, 34 than the energy-storage devices 32' have between their ends 33', 34'. Thus all of the clutch elements 21a, 21b are ultimately able to shift axially but are connected nonrotatably to the opposing pressure element 23.

Figure 6:
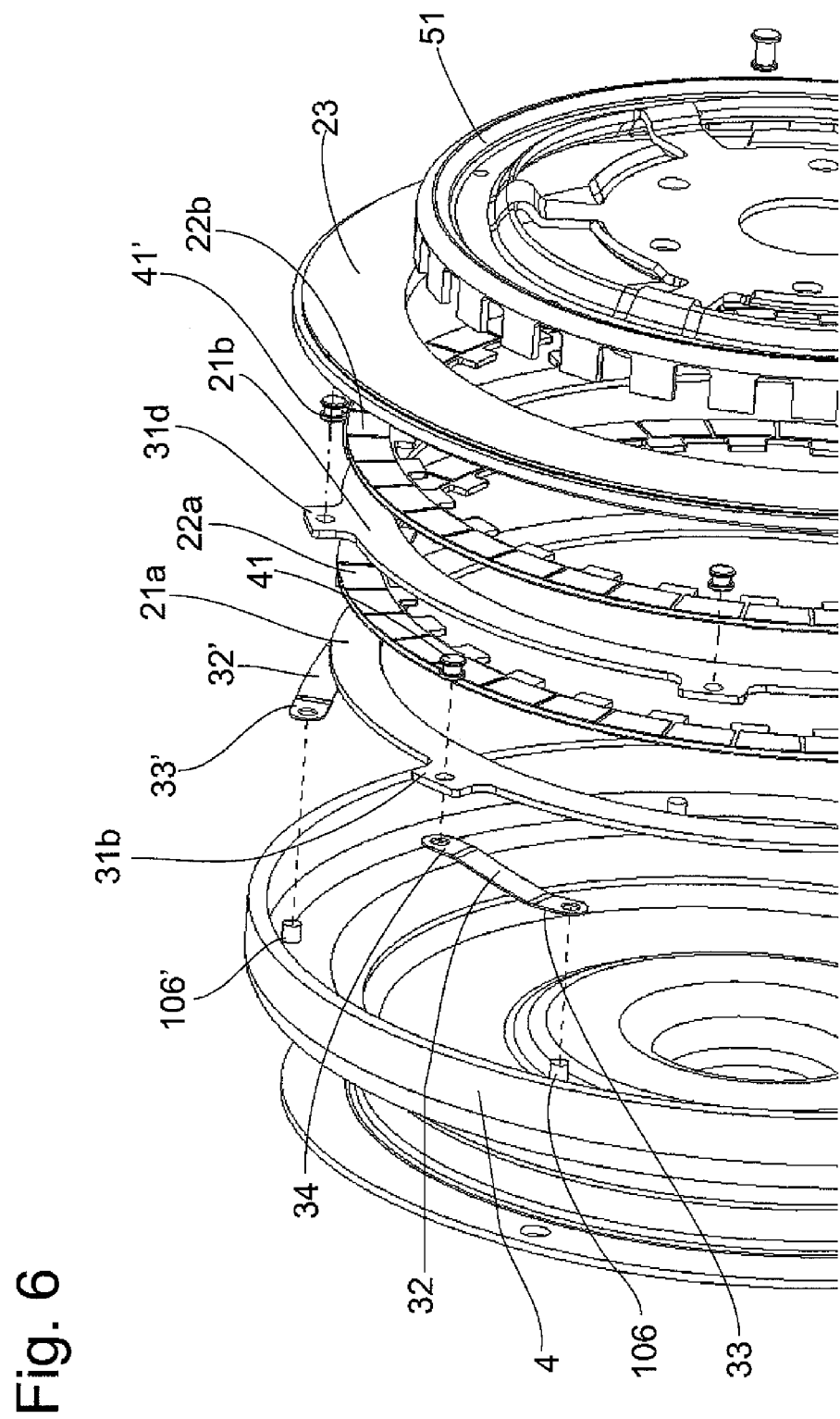
FIG. 6 is similar to FIG. 5, except that all of the drive-side clutch elements are connected to a clutch housing of the clutch device.

In the design according to FIG. 6, the energy-storage devices 32 and 32' again have different angles between the their ends 33, 33' and 34, 34'. In contrast to FIG. 5, however, all of the clutch elements 21a, 21b are connected with freedom of axial movement but nonrotatably to pins 106, 106' of the clutch housing 2, in particular to pins on the housing cover 4 in the present case. For this purpose, the first ends 33, 33' of the energy-storage devices 32, 32' are connected by way of the pins 106, 106' to the energy-storage device mounts 31, 31' on the housing cover 4. Whereas the second ends 34 of the energy-storage devices 32 act by way of rivets 41 on the energy-storage device mounts 31b on the clutch element 21a, the second ends 34' of the energy-storage devices 32' are connected by rivets 41' to the energy-storage device mounts 31d of the clutch element 21b. Because the clutch element 21a is closer axially to the housing cover 4 than the clutch element 21b is, the energy-storage devices 32 have a smaller angle between their ends 33, 34 than the energy-storage devices 32' have between their ends 33', 34'.

The invention is not limited by the embodiments described above which are presented as examples only but can be modified in various ways within the scope of protection defined by the appended patent claims.

We claim:

1. A clutch arrangement comprising a clutch housing, a takeoff, and a clutch device for transmitting torque between the clutch housing and the takeoff, the clutch device comprising:
- at least one drive-side clutch element;
- at least one takeoff-side clutch element;
- a pressure element;
- an opposing pressure element which cooperates functionally with the pressure element to establish and release a working connection between the at least one drive-side clutch element and the at least one takeoff side clutch element, wherein the opposing pressure element is mounted nonrotatably and without freedom of axial movement on the clutch housing; and
- axially acting energy storage devices connecting the opposing pressure element and the at least one drive-side clutch element, said at least one takeoff-side clutch element being located between one of said at least one drive-side clutch element and said opposing pressure element, and between one of said at least one drive-side clutch element and any adjacent said drive-side clutch element.

2. The clutch arrangement of claim 1 wherein each of said axially acting energy storage devices has one end attached to one of said at least one drive-side clutch element and another end attached to one of the opposing pressure element and another said drive-side clutch element.

3. The clutch arrangement of claim 2 wherein each said at least one drive-side clutch element has a ring-shaped base body and a plurality of radially extending mounts to which respective said ends of said axially acting energy storage devices are fixed.

4. The clutch arrangement of claim 3 wherein the axially acting energy storage devices are leaf springs which extend substantially tangentially to the ring-shaped base body.

5. The clutch arrangement of claim 1 wherein the axially acting energy storage devices are pre-stressed to axially separate one of said at least one drive-side clutch element from said opposing pressure element, and to axially separate one of said at least one drive-side clutch element from any adjacent said drive-side clutch element.

6. The clutch arrangement of claim 1 wherein the axially acting energy storage devices are pre-stressed to axially draw one of said at least one drive-side clutch element toward said opposing pressure element, and to axially draw one of said at least one drive-side clutch element toward any adjacent said drive-side clutch element.

7. The clutch arrangement of claim 1 wherein the pressure element separates a first pressure space from a second pressure space, wherein positive pressure in the first pressure space relative to the second pressure space causes an axial displacement of the pressure element toward the clutch elements and toward the opposing pressure element, and the displacement of the clutch elements toward each other and toward the opposing pressure element.

8. The clutch arrangement of claim 1 wherein the pressure element separates a first pressure space from a second pressure space, wherein positive pressure in the second pressure space relative to the first pressure space causes an axial displacement of the pressure element away from the clutch elements and from the opposing pressure element, and the displacement of the clutch elements away from each other and from the opposing pressure element.

9. The clutch arrangement of claim 1 wherein the clutch housing comprises a housing cover and main housing part enclosing a hydrodynamic circuit, the opposing pressure element being located axially between the housing cover and main housing part.

10. The clutch arrangement of claim 9 wherein the opposing pressure element is connected to the housing cover and the main housing part by one of welding and laser welding.

11. The clutch arrangement of claim 1 further comprising a torsional vibration damper having an input part and an output part, the at least one take-off side clutch element being connected to the input part for rotation in common.

12. The clutch arrangement of claim 11 further comprising a hydrodynamic circuit formed by a pump wheel and a turbine wheel in the clutch housing, the input part being connected nonrotatably to the turbine wheel, the output part being connected nonrotatably to the takeoff.

13. The clutch arrangement of claim 1 further comprising a flow guide element between the pressure element and the clutch elements, at least one flow groove being formed axially between the flow guide element and the pressure element.

14. The clutch element of claim 13 wherein the pressure element acts on the clutch elements by way of the flow guide element.

15. A clutch arrangement comprising a clutch housing, a takeoff, and a clutch device for transmitting torque between the clutch housing and the takeoff, the clutch device comprising:
- at least one drive-side clutch element;
- at least one takeoff-side clutch element;
- a pressure element;
- an opposing pressure element which cooperates functionally with the pressure element to establish and release a working connection between the at least one drive-side clutch element and the at least one takeoff side clutch element,
- axially acting energy storage devices connecting the clutch housing and the at least one drive-side clutch element for rotation in common, the at least one said takeoff-side clutch element being located between one of said at least one drive-side clutch element and said clutch housing, and between one of said at least one drive-side clutch element and any adjacent said at least one drive-side clutch element,
- wherein each of said axially-acting energy storage devices has one end attached to one of said at least one drive-side clutch element and another end attached to one of the clutch housing and another said drive-side clutch element, and
- wherein each said at least one drive-side clutch element has a ring-shaped base body and a plurality of radially extending mounts to which respective said ends of said axially-acting energy storage devices are fixed.

16. The clutch arrangement of claim 15 wherein the axially acting energy storage devices are leaf springs which extend substantially tangentially to the ring-shaped base body.

17. The clutch arrangement of claim 15 wherein the axially acting energy storage devices are pre-stressed to axially separate one of said at least one drive-side clutch element from said clutch housing, and to separate one of said at least one drive-side clutch element from any adjacent said at least one drive-side clutch element.

18. The clutch arrangement of claim 15 wherein the axially acting energy storage devices are pre-stressed to axially draw one of said at least one drive-side clutch element toward said clutch housing, and to draw one of said at least one drive-side clutch element toward any adjacent said at least one drive-side clutch element.

* * * * *